3,483,770
SAFETY STEERING FOR MOTOR VEHICLES
Josef Eibl, Waiblingen, and Wilhelm Albrecht, Vaihingen, Germany, assignors to Daimler-Benz Aktiengesellschaft, Stuttgart-Unterturkheim, Germany
Filed Dec. 8, 1967, Ser. No. 689,097
Claims priority, application Germany, Dec. 9, 1966, D 51,746
Int. Cl. B62d 1/16
U.S. Cl. 74—552   21 Claims

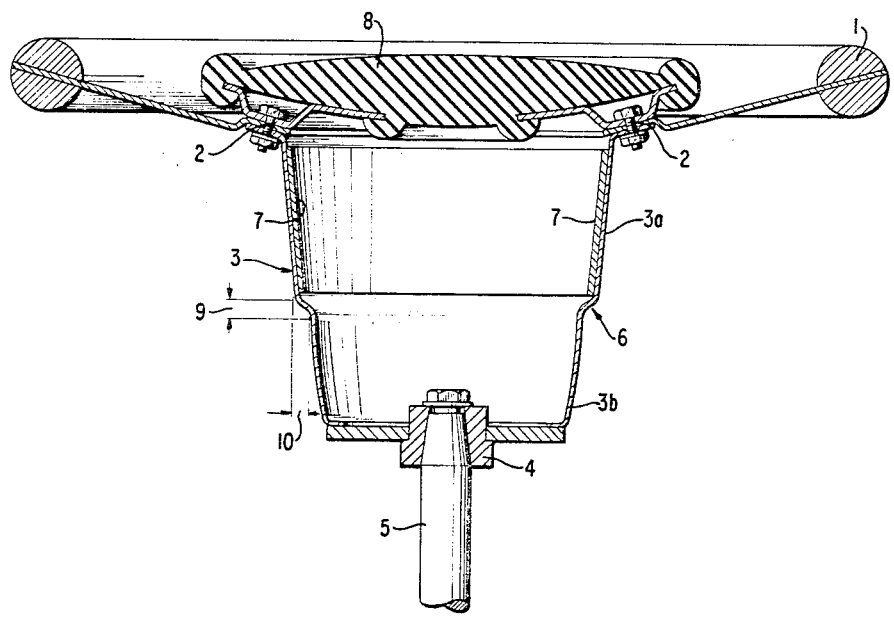

ABSTRACT OF THE DISCLOSURE

A safety steering for motor vehicles in which a deformation pot is arranged between the steering wheel and the steering spindle which has several sections of different diameter with the diameter decreasing from the steering wheel to the steering spindle, whereby the effective wall thickness of successive sections is alternately larger and smaller.

BACKGROUND OF THE INVENTION

The present invention relates to a safety steering for motor vehicles in which a conically constructed deformation member, consisting, for example, of sheet metal and provided with step-shaped mutually offset sections, is arranged between a head piece of the steering spindle and the steering wheel which deformation member converts during accidents at least a part of the impact energy of the driver into deformation work and thereby contributes to the protection of the driver.

Such types of deformation members which are also referred to as impact pots and in which the wall thickness remains constant over the entire length are already known in the prior art.

However, intensive tests have indicated that though such impact pots have a sufficiently large torsional rigidity in order to transmit the steering movements completely satisfactorily to the steering spindle, on the other hand, in case of impact of the driver against the steering wheel, which in practice never takes place accurately in the axial direction, no pure telescopic collapse of the impact pot occurs but a lateral deflection simultaneously occurs in the prior art devices. This means, however, that the forces necessary for the compression of the impact pot and which must exceed a certain predetermined amount, cannot be predetermined with sufficient accuracy beforehand because the impact direction on the steering wheel plays a decisive roll in connection therewith.

SUMMARY OF THE INVENTION

The present invention is, therefore, concerned with the aim to avoid these disadvantages and to create, starting with the known constructions, a deformation member, with which, in case of an accident, a completely satisfactory telescopic collapse of the individual sections of different diameters is assured without substantial lateral deflection.

According to the present invention a safety steering for motor vehicles is proposed with a conically constructed deformation member arranged between the steering spindle and the steering wheel and provided with step-shaped mutually offset sections whose diameter decreases from the steering wheel to the steering spindle whereby the effective wall thicknesses of mutually succeeding sections of different diameter are alternately greater and smaller, respectively.

The height of the section provided with a greater wall thickness is thereby preferably larger or at least equal to the height of the section with smaller wall thickness.

According to a particularly advantageous construction of the present invention the increase of the wall thickness is achieved in each case by rings inserted into the deformation member and connected therewith, for example, by welding.

According to a further preferred construction of the present invention, the transitions between the individual sections are constructed as curved surfaces, and more particularly, preferably as radii of curvature.

It is finally of advantage if these radii of curvature correspond approximately to ten times the lesser wall thickness.

A particularly favorable construction is furthermore achieved in that the height and depth of the transitions constructed as radii are approximately equally large.

Accordingly, it is an object of the present invention to provide a safety steering which avoids by simple means the aforementioned shortcomings and drawbacks encountered in the prior art.

Another object of the present invention resides in a safety steering of the type described above in which the deformation pot will reliably collapse in a telescopic manner upon impact of the driver against the steering wheel regardless of the direction of the impact.

A further object of the present invention resides in a safety steering device for motor vehicles in which a completely satisfactory telescoping of the various sections of different diameter of the deformation pot is assured by structurally simple and inexpensive means.

These and further objects, features and advantages of the present invention will become more obvious from the following description when taken in connection with the accompanying drawing which shows, for purposes of illustration only, one embodiment in accordance with the present invention, and wherein:

The single figure is a longitudinal cross-sectional view through one embodiment of a safety steering in accordance with the present invention.

Referring now to the single figure of the drawing, a conically constructed impact pot generally designated by reference numeral 3 is secured at the steering wheel 1 by way of a threaded connection 2. The deformation member or impact pot 3 comprises two sections 3a and 3b of different diameter and different effective wall thickness. At its other end the impact pot 3 is threadably connected by way of a hub 4 with the upper end of the steering spindle 5. The transition between the two sections 3a and 3b of the impact pot 3 is constructed as radius of curvature 6.

For purposes of increasing the effective wall thickness a ring 7 is inserted into the section 3 of the impact pot 3 facing the steering wheel 1 and is welded to the inner wall of the impact pot 3.

In order to offer as large as possible an impact surface to the body of the driver in case of an accident, a padding plate 8 of conventional construction is provided at the steering wheel 1 which is connected by way of the threaded connection 2 both with the steering wheel 1 as well as with the impact pot 3.

The transition between the sections 3a and 3b of the impact pot 3 which is constructed as radius of curvature 6 is thereby so dimensioned that its height 9 and its depth 10 are about equal.

It is assured by such a construction and design of the impact pot 3 that in case of accidents and of straight or inclined impacts of the driver against the steering wheel 1 which are caused thereby, the wall of the thin-walled section 3b of the impact pot 3 is deformed and is practically folded or inverted into the upper section 3a without the occurrence at that time of an uncontrollable lateral deflection of the impact pot 3.

While we have shown and described only one embodiment, it is understood that the present invention is not limited thereto but is susceptible of numerous changes and modifications as known to a person skilled in the art. For example, the present invention is not limited to a construction with only two sections 3a and 3b but essentially consists in that sections with larger and smaller wall thickness and thus with differing rigidity and bending resistance alternate with one another. Thus, it is obvious that the present invention is not limited to the details shown and described herein, but is susceptible of numerous changes and modifications, and we therefore do not wish to be limited to these details but intend to cover all such changes and modifications as are encompassed by the scope of the appended claims.

We claim:

1. A safety steering for motor vehicles with a deformation member arranged between and operatively connected to the steering spindle and the steering wheel which is conically constructed and provided with at least two sections mutually offset in a substantially step-shaped manner, wherein the improvement comprises successive sections of said deformation member of different diameter having an effective wall thickness which is alternately greater and smaller.

2. A safety steering according to claim 1, wherein the height of a section having a greater effective wall thickness is at least equal to the height of the section with lesser wall thickness.

3. A safety steering according to claim 1, wherein the height of a section having a greater effective wall thickness is larger than the height of the section with lesser wall thickness adjoining the same.

4. A safety steering according to claim 3, further comprising ring means inserted into the deformation member and rigidly connected therewith for increasing the effective wall thickness of a respective individual section.

5. A safety steering according to claim 4, wherein the ring means are welded to the deformation member.

6. A safety steering according to claim 4, wherein transitions are provided between the individual sections which are constructed as curved surfaces.

7. A safety steering according to claim 6, wherein the radii of curvature of the curved surfaces correspond approximately to ten times the smaller wall thickness of the adjacent section with smaller wall thickness.

8. A safety steering according to claim 7, wherein the height and depth of the transitions constructed as radii of curvature are approximately equally large.

9. A safety steering according to claim 6, wherein the height and depth of the transitions constructed as radii of curvature are approximately equally large.

10. A safety steering according to claim 1, further comprising ring means inserted into the deformation member and rigidly connected therewith for increasing the effective wall thickness of a respective individual section.

11. A safety steering according to claim 10, wherein the ring means are welded to the deformation member.

12. A safety steering according to claim 1, wherein transitions are provided between the individual sections which are constructed as curved surfaces.

13. A safety steering according to claim 1, wherein transitions are provided between the individual sections which are constructed as radii of curvature.

14. A safety steering according to claim 13, wherein the radii of curvature correspond approximately to ten times the smaller wall thickness of the adjacent sections with smaller wall thickness.

15. A safety steering according to claim 14, wherein the height and depth of the transitions constructed as radii of curvature are approximately equally large.

16. A safety steering according to claim 12, wherein the height and depth of the transitions are approximately equally large.

17. A safety steering according to claim 12, further comprising ring means inserted into the deformation member and rigidly connected therewith for increasing the effective wall thickness of a respective individual section.

18. A safety steering according to claim 13, further comprising ring means inserted into the deformation member and rigidly connected therewith for increasing the effective wall thickness of a respective individual section.

19. A safety steering according to claim 12, wherein the height of a section having a greater effective wall thickness is at least equal to the height of the section with lesser wall thickness.

20. A safety steering according to claim 13, wherein the height of a section having a greater effective wall thickness is at least equal to the height of the section with lesser wall thickness.

21. A safety steering for motor vehicles with a deformation member arranged between and operatively connected to the steering spindle and the steering wheel which is provided with at least two sections, wherein the improvement comprises successive sections of said deformation member of different diameter having an effective wall thickness which is different for two adjacent sections.

References Cited

UNITED STATES PATENTS

| 3,016,764 | 1/1962 | Fredericks et al. | 74—552 |
| 3,146,014 | 8/1964 | Kroell | 188—1 |
| 3,285,091 | 11/1966 | Fiala | 74—552 |
| 3,396,599 | 8/1968 | Altmann | 74—492 |

FOREIGN PATENTS 1,342,654  9/1963  France.

FRED C. MATTERN, Jr., Primary Examiner

F. D. SHOEMAKER, Assistant Examiner